United States Patent

[11] 3,576,529

| [72] | Inventor | Marvin L. Garrison |
| | | R.R. 2, Seymour, Ind. 47274 |
| [21] | Appl. No. | 618,499 |
| [22] | Filed | Feb. 24, 1967 |
| [45] | Patented | Apr. 27, 1971 |

[54] DECELERATION WARNING DEVICE
3 Claims, 3 Drawing Figs.

[52] U.S. Cl. .................................................. 340/72,
200/61.89, 200/153
[51] Int. Cl. .................................................... B60q 1/46
[50] Field of Search ...................................... 200/61.89,
153.19, 172 (A); 74/567, 450; 340/52, 67, 71, 72

[56] References Cited
UNITED STATES PATENTS

| 1,496,208 | 6/1924 | Northrop et al. | (74/450UX) |
| 1,555,309 | 9/1925 | Mott | (340/62UX) |
| 2,178,754 | 11/1939 | Hennessy | (74/567UX) |
| 2,276,378 | 3/1942 | Duguay | 200/61.89 |
| 2,504,381 | 4/1950 | Bordelon | (200/153.19UX) |
| 2,648,234 | 8/1953 | Lester | 200/153(.19)X |
| 2,918,652 | 12/1959 | Epstein | 340/262X |
| 2,986,954 | 6/1961 | Werner | 74/567X |
| 3,320,586 | 5/1967 | Wagner | 340/66 |

FOREIGN PATENTS

| 640,708 | 6/1962 | Italy | 200/153(.19) |

Primary Examiner—Alvin H. Waring
Assistant Examiner—Kenneth N. Leimer
Attorney—Cohn and Powell ABSTRACT: A sleeve attached to an automobile accelerator rod, the sleeve having circumferential ribs and grooves forming a longitudinal cammed configuration which coacts with a microswitch as the accelerator rod is moved back and forth.

Relaxation of the foot pressure on the accelerator rod causes relative movement between the cammed surface of the sleeve and the microswitch, alternately activating a flashing indicator.

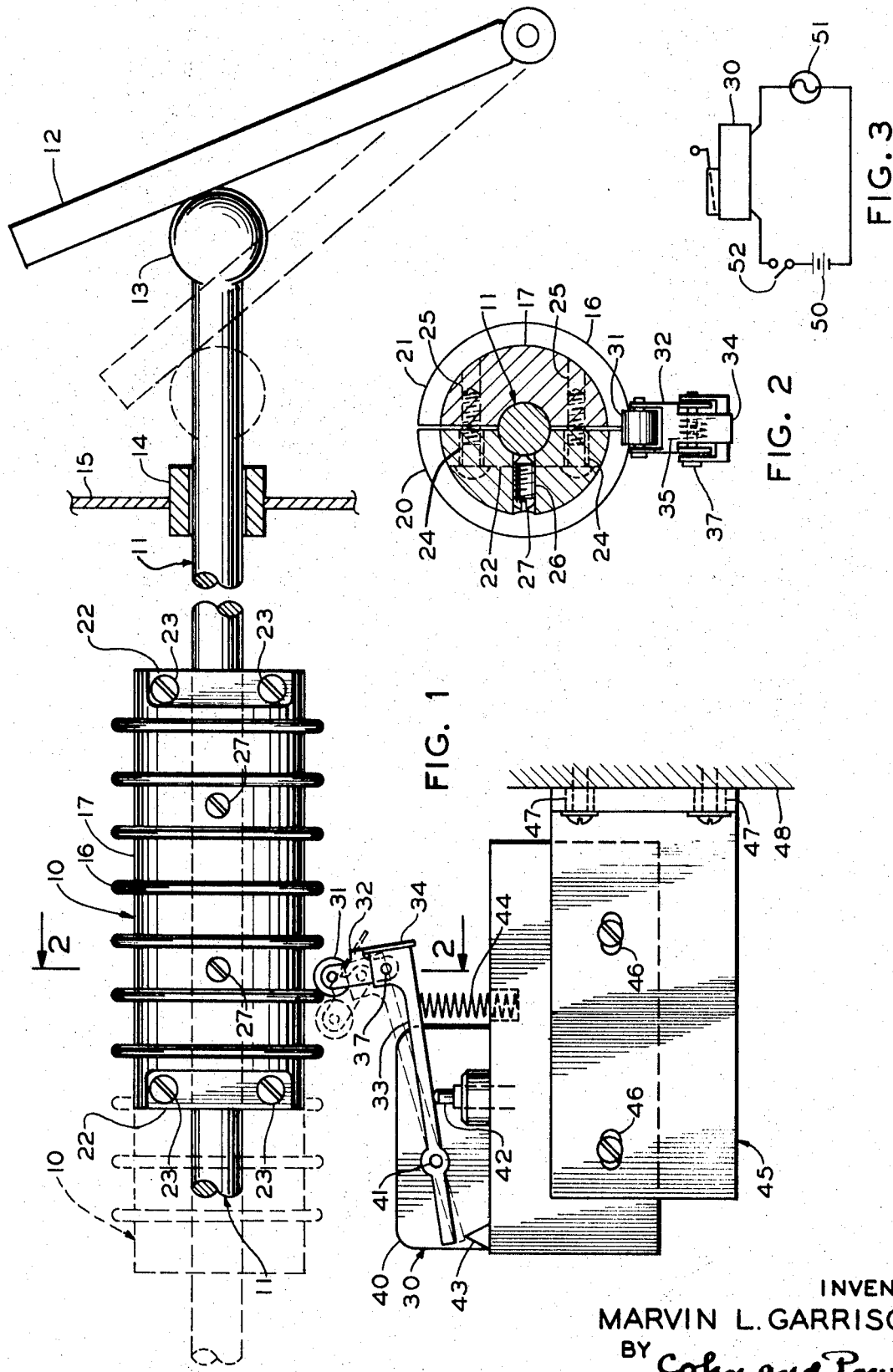

DECELERATION WARNING DEVICE

BACKGROUND OF THE INVENTION

This invention relates generally to a deceleration warning device, and more particularly to a deceleration device actuated during the release of an automobile accelerator foot pedal.

Brake warning lights are standard equipment on modern automobiles and have undoubtedly served to prevent many accidents by providing a warning to following drivers who are tailgating either inadvertently or because of congested road conditions.

On modern highways, permissible speeds in access of 70 m.p.h. are common. This speed represents a coverage distance of about 100 feet in 1 second. In the normal sequence of slowing down, the driver relaxes his foot pressure on the accelerator pedal, transfers his foot to the brake pedal and depresses the brake pedal. In the conventional brake light system, no warning of speed decrease is given until the brake pedal is properly depressed. The automobile speed has, however, been decreasing from the instant that the pressure on the accelerator pedal was relaxed. This action, and not simply the brake action alone, contributes significantly to the retardation of the vehicle. A warning that a sudden decrease of speed is imminent would contribute significantly to automobile safety and lessen the hazard of driving.

In designing a brake warning light system no particular difficulty is encountered. An electrical switch, energized when the brake pedal is depressed and deenergized when it is released, is all that is necessary. The situation is more complex in the case of a deceleration device since the warning is required only when the automobile decelerates, and preferably from the instant the deceleration commences.

The known deceleration warning devices have gained no public acceptance because of their complexity and general unreliability.

U.S. Pat. No. 2,339,910 shows a device in which a spiral spring is attached at its free end to a slide, the other end being attached to an electrical terminal. The slide is connected to the accelerator rod and moves parallel to the rod as the rod is depressed or released. The spring is uncoiled through contact succession of electrical terminals thereby activating a number of lights to indicate acceleration. This device does not provide an indication of deceleration only. Nor is any camming action indicated.

U.S. Pat. No. 2,420,351 indicates another device which is designed to provide a warning on deceleration by means of the action of a pendulum which moves in one direction upon deceleration, thereby closing an electrical contact and energizing an indicator means. This device suffers from the disadvantage that it may be inadvertently activated while the automobile is traveling down a slope and, though the mechanism may be compensated to adjust for this to some extent, such compensation will result in a loss of sensitivity in the mechanism. There is no camming action illustrated in this device which would enable the device to be utilized to activate a flashing indicator.

U.S. Pat. No. 2,452,762 illustrates a deceleration device operating on the dashpot effect of a spring-loaded piston having a leather washer head. Acceleration causes the piston to move upward by direct physical contact with the automobile acceleration mechanism. Upon deceleration, the physical contact is broken and a bellcrank falls, operating a warning indicator by closing an electrical circuit. The physical contact is maintained when the piston reaches the end of the downward stroke. A delay is provided but, because this is the result of the suction effect of the leather piston head, it is somewhat indefinite. No camming action is present nor is there provision for positive flashing action.

U.S. Pat. No. 2,552,665 discloses a switch mechanism formed by providing a special carburetor throttle adjustment screw and connecting it to the lighting system circuitry so that when deceleration has taken place, the accelerator rod actuates a bellcrank which brings the throttle adjustment screw into contact with a stop block, thereby closing the circuit of an electrical indicator. This device does not operate until such time as the foot pedal is completely released. There is no deceleration indication during the deceleration period. As with the previously mentioned patents no camming system is utilized in this device.

U.S. Pat. No. 2,926,224 is similar to the patent just described in that a switch is provided having contacts which are closed by the action of a contact arm which is attached to the accelerator rod. No indication appears until the foot pedal is released. No cams of any sort are used in this device.

None of the above patents, nor any other of those reviewed indicates a device operating by means of multiple cam action which indicates deceleration during the deceleration period.

SUMMARY OF THE INVENTION

The deceleration warning device includes a cam which cooperates with a microswitch arm to activate an indicator during deceleration of an automobile, the indicator being in a deactivated state during acceleration.

The automobile acceleration mechanism provides a means of inducing relative movement between the cam and the microswitch, one of these two cooperating elements being attached to the accelerator rod.

The microswitch intermittently closes an electrical circuit, thereby activating an indicator, when relative movement between the cam and the microswitch corresponds to the deceleration motion of the accelerator rod. When the motion of the rod is reversed the switch is maintained in an open circuit position.

A plurality of ribs and grooves forms the cam surface providing means alternately energizing and deenergizing the switch during deceleration, thereby activating a flashing indicator signal.

The cam configuration is formed on the external surface of a sleeve which is attached to the accelerator rod.

The cammed sleeve is constructed preferably in two semicylindrical portions to allow easier installation of the sleeve on the accelerator rod.

The features referred to in this summary, together with numerous advantages of the invention, will more clearly appear from the following detailed description of a preferred embodiment, particularly when considered in connection with the accompanying drawing.

BRIEF DESCRIPTION OF THE DRAWING

FIG. 1 is an elevation of the cammed sleeve and the microswitch during deceleration. Phantom lines show the relative positions of the cammed sleeve and microswitch during acceleration.

FIG. 2 is a sectional, elevational view on line 2–2 of FIG. 1.

FIG. 3 is a typical electrical circuit including the microswitch.

DESCRIPTION OF THE PREFERRED EMBODIMENT

Referring now by characters of reference to the drawing, and first to FIG. 1, it will be understood that the invention includes a sleeve 10 adjustably mounted on an accelerator rod 11, the accelerator rod being an integral part of a vehicle acceleration-actuating mechanism. It will be understood that depression of the foot pedal 12, which is in contact with the balled end 13 of the accelerator rod 11, induces motion into the accelerator rod 11 through a guide collar 14 which is inset into a partition 15 thereby actuating the throttle valve and causing the vehicle to accelerate.

The sleeve 10 includes a plurality of circumferential ribs 16 and grooves 17 alternately spaced at intervals along the length of the sleeve 10 and constituting protuberances having depressions therebetween. The circumferential grooves 17 separate the peaks formed by the ribs 16, the ribs 16 providing a cammed surface having a length in excess of the total movement of the accelerator rod 11.

The sleeve 10 is preferably split longitudinally into two elements 20 and 21 to facilitate installation of the sleeve 10 on the accelerator rod 11. Seating faces 22 are provided at each end of element 20 to provide a bearing surface for the heads of screws 23. These screws 23 are inserted into oversized holes 24 in element 20 and screwed into threaded holes 25 in element 21, thereby connecting the two elements 20 and 21 together to form the sleeve 10. Threaded holes 26 are provided in element 20 to accommodate setscrews 27 which fix the sleeve 10 to the rod 11 and provide sleeve 10 with an adjustment capability on the accelerator rod 11.

A microswitch 30 is adjustably and independently mounted in fixed operable location adjacent to the sleeve 10, and includes a roller 31 rotatably mounted at the end of a roller arm 32. The roller arm 32 and roller 31 constitute an actuating member. The arm 32 is pivotally attached to the end of a resilient magnifying lever 33. The roller arm 32 is provided with a downwardly depending plate 34 which acts as a stop means limiting the rotation of the roller arm 32 in one direction to a primed position. A spring 35, wound around the pivot 37 of the roller arm 32, cooperates with the resilient magnifying lever 33 and the stop plate 34 to return the roller arm 32 to a primed position after rotation of the roller arm 32 in the other direction to a nonprimed position.

The resilient magnifying lever 33 is pivotally mounted to a sidewall 40 of the microswitch 30 by a pivot 41. The lever 33 operates the internally sprung pushbutton 42, and the lever 33 is returned to a neutral position, delimited by a stop 43, by a compression spring 44.

The microswitch 30 is adjustably mounted to a bracket 45, the bracket 45 being provided with slots 46 and 47 to provide means for adjusting the bracket 45 relative to a support 48.

As the accelerator rod 11 moves in a direction to cause the vehicle to decelerate, and relative movement is induced between the sleeve 10 and the microswitch 30, the microswitch roller 31 cooperates with the cammed surface of the sleeve 10, formed by ribs 16 separated by grooves 17. The cammed action of the sleeve 10 causes roller arm 32 to be moved to the primed position shown by full lines in FIG. 1, and causes the roller arm 32 to reciprocate transverse to the direction of sleeve movement upon continued movement of the sleeve 10 in the same direction. This reciprocative movement makes and breaks the switch circuit by depressing the lever against the pushbutton 42. On the return, accelerating stroke, on the other hand, the roller 31 microswitch 30 rides freely over the cams and the roller arm 32 is moved to the nonprimed position shown in broken lines in FIG. 1.

The microswitch 30 is inserted in an electrical circuit as shown in FIG. 3, the circuit including the vehicle battery 50, an indicator 51 which preferably takes the form of a lamp, and an ignition switch 52. If desired the microswitch 30 may be incorporated into the brake light circuitry.

It is thought that the functional advantages of the sleeve 10 and microswitch 30 assembly have become fully apparent from the foregoing detailed description of parts, but for completeness of disclosure, the installation of the assembly will be briefly described. The principle parts of the sleeve 10, namely elements 20 and 21, are held in alignment about the accelerator rod 11. The two elements 20 and 21 of sleeve 10 are then connected by means of screws 23 to form the sleeve 10.

The sleeve 10 is installed on the accelerator rod 11 at a convenient location such as to avoid interference with the surrounding parts of the vehicle. When a convenient location has been determined, the setscrews 27 are tightened against the accelerator rod 11.

The microswitch 30 is independently and adjustably mounted on support 48 by bracket 45 to allow the microswitch 30 to be adjusted until the roller 31 is brought into correct alignment with the contoured surface of the sleeve 10. This will normally be achieved when the roller 31 is closely adjacent the innermost portion of one of the grooves 17 separated by ribs 16.

When the foot pedal 12 is depressed the accelerator rod 11, including the sleeve 10, is moved in a direction relative to the microswitch 30. The microswitch 30 is so chosen that movement of the accelerator rod 11 in a direction causing the vehicle to accelerate, does not cause movement of the lever 33, but rather tilts the roller arm 32 into a counterclockwise direction to a nonprimed position as shown by the phantom outline of the switch in FIG. 1. As the foot pedal 12 is released, however, and relative movement between the sleeve 10 and the microswitch 30 is in the opposite direction. Stop plate 34 prevents clockwise movement of the roller arm 32 beyond a predetermined primed position. The reciprocal motion induced into the roller 31 and the roller arm 32 is imparted into the lever 33, thereby alternately activating and deactivating the indicator 51 to flash intermittently during the deceleration period. It will be clear that the choice of a microswitch having a lever 33 provides a magnification of the throw of the pushbutton 42. Because of this, a less sensitive, and therefore a more practical switching arrangement is provided.

It will be obvious that the cam and switch assembly can be arranged to activate the indicator during acceleration rather than during deceleration, as for example, by merely turning the microswitch end for end.

I claim:

1. A deceleration warning device, in combination with a vehicle acceleration system comprising:
   a. switch means including an actuating member, a stop member and spring means urging the actuating member against the stop member into a primed position, wherein the actuating member can actuate the switch means on reciprocation,
   b. a sleeve having a plurality of ribs and grooves,
   c. the actuating member operatively engaging the ribs and grooves,
   d. indicator means connected to the switch means, and
   e. movable means in the acceleration system including an accelerator rod adjustably mounting the sleeve, and providing relative movement in one direction, during deceleration, between the switch means and the sleeve to reciprocate the primed actuating member engaging the ribs and grooves for actuating the switch means and alternately activating and deactivating the indicator means upon continued relative movement of the switch means and the sleeve in said one direction during deceleration,
   f. the accelerator rod providing relative movement in the other direction, during acceleration, between the switch means and the sleeve to urge the actuating member away from the stop member and out of the primed position whereby the actuating member cannot actuate the switch means.

2. A deceleration warning device as defined in claim 1, in which:
   g. the sleeve is cylindrical and has a plurality of circumferential ribs and grooves disposed in spaced, alternate relation along the length of the sleeve,
   h. the switch means includes a pivoted lever arm member carrying the actuating member a spaced distance from the pivot axis and a pushbutton disposed in engaging relation to said pivoted lever arm member at a distance from the pivot axis that is less than the distance between the pivot axis and the actuating member, and
   i. bracket means adjustably secure the switch means to a support.

3. A deceleration warning device as defined in claim 2, in which:
   j. the sleeve is longitudinally split into two matching and substantially similar elements mutually connected to embrace the accelerator rod.